Aug. 28, 1956 E. H. NELSON ET AL 2,760,310

QUARTZ-TO-METAL SEAL

Filed Jan. 13, 1951

Inventors:
Evan Herbert Nelson,
Jack Whittemore,
by Vernet C. Kauffman
His Attorney.

United States Patent Office 2,760,310
Patented Aug. 28, 1956

2,760,310

QUARTZ-TO-METAL SEAL

Evan Herbert Nelson, Harrow Weald, and Jack Whittemore, Wembley, England, assignors to General Electric Company, a corporation of New York Application January 13, 1951, Serial No. 205,882
2 Claims. (Cl. 49—81)

Figure 1:
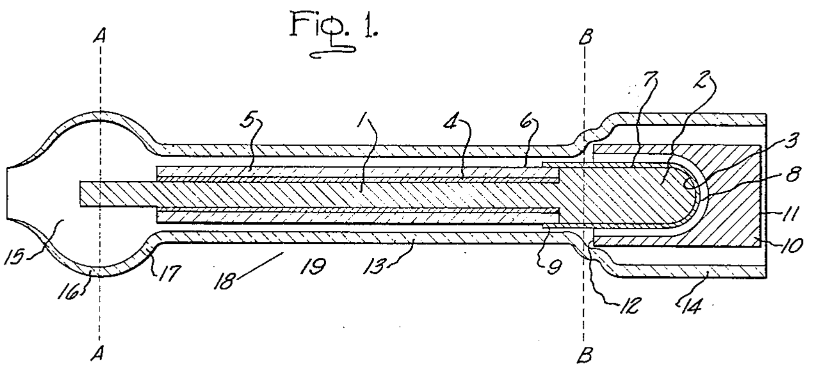

This invention relates to quartz-metal seals of the type wherein at least part of the hermetic sealing of a conductive path extending through a quartz body is provided by the sealing of a thin sheet of metal to the quartz; the invention relates also to the manufacture of such quartz-metal seals. Here and hereinafter it will be understood that the term "quartz" includes any vitreous material whose softening temperature is as high as or not much less than that of quartz.

Such quartz-metal seals are used in the manufacture of electric discharge devices having quartz envelopes, such as some forms of high pressure mercury vapor electric discharge lamps, for providing a hermetically sealed conductive path between the interior and exterior of the envelope for the supply of operating current or voltage to one or more electrodes of the device. Usually the quartz-metal seal is provided by a body of quartz, known as a seal-body, or stem, formed separately from the envelope and through which the conductive path is hermetically sealed, which body is subsequently sealed into, so as to hermetically close, an aperture in the quartz envelope of the device; the invention relates in particular, though not exclusively, to the manufacture of quartz seal-bodies or stems adapted for such use.

The invention is applicable both to quartz-metal seals of the kind wherein the thin sheet of metal provides part of the conductive path through the quartz, as in the so-called "strip" seals, and to the kind wherein the conductive path is carried through an aperture of the sheet by a conductor which is brazed or soldered to the sheet so as to hermetically close the aperture, the sheet being sealed to quartz around the aperture.

Since the sealing between the quartz and the metal sheet is effected by contact between the sheet and the heat-softened quartz, the metal of the sheet must be sufficiently refractory to withstand the very high temperature, usually about 1800° C., to which the quartz must be heated to soften it adequately for forming the seal. For this reason the sheets employed hitherto have usually been either of tungsten or of molybdenum. These metals are sufficiently refractory to withstand the temperature of the heated quartz but have the disadvantage that they are readily oxidized. Oxidation during the making of the seal can be avoided by taking suitable precautions; but after the seal has been completed, it is usually possible for air to reach some part of the metal sheet, even if the sheet is not actually exposed directly to the atmosphere, and there exists the danger that oxidation of the sheet may occur and lead to failure of the seal. This danger is particularly acute where the metal sheet reaches a high temperature in operation of the device of which it forms part.

It has previously been proposed, generally, to avoid this difficulty by the use of platinum for forming the thin metal sheet, since platinum is much more resistant to oxidation than either tungsten or molybdenum, but platinum has the disadvantage that its melting point is very close to the softening temperature of quartz, so that the thin sheet is liable to be damaged during the making of the seal and a defective seal obtained. For this reason, platinum has not hitherto been much used in practice.

The principal object of this invention is to provide a method for facilitating the manufacture of quartz-metal seals of the type specified when the thin metal sheet is of platinum. Here and hereinafter in this specification it will be understood that the term "platinum" includes any alloy of platinum whose resistance to oxidation is similar to that of platinum, such as for example, platinum-iridium alloys. Further objects and advantages of the invention will appear from the following description thereof.

According to the invention, in the manufacture of a quartz-metal seal of the type specified wherein the thin metal sheet is of platinum, during the sealing of the sheet to the quartz an appreciable area of the surface of the sheet adjacent to the region of sealing to the quartz is maintained in good thermal contact with a massive refractory heat-conductive body adapted to conduct away from the sheet an appreciable amount of the heat developed in the sheet at the said region.

The term "massive" implies that the cross-sectional area of the said heat-conductive body is considerably greater than the cross-sectional area of the sheet, and the term "refractory" implies that the heat-conductive body must be capable of withstanding the heat developed during the sealing sufficiently to enable it to perform its function of conducting heat away from the platinum sheet to prevent the sheet from being damaged by heat at the region of sealing to the quartz; preferably the body is of tungsten or molybdenum.

Preferably the greater part of the surface area on at least one face of the sheet is maintained in good thermal contact with the said heat-conductive body during the sealing, and the region of the sealing to the quartz preferably extends only over a small part of the total surface area of the sheet.

In some cases the heat-conductive body may consist of two or more separate parts, for example, a first part in contact with one surface of the platinum sheet and a second part in contact with the other surface of the sheet. Also, in some cases the heat-conductive body, or a part thereof, may be provided by a massive conductor which forms part of the conductive path through the quartz in the completed seal.

Thus, in one preferred method of carrying out the invention, a seal-body or stem comprises a quartz tube, along which extends a massive rod of refractory metal, such as tungsten or molybdenum, and a thimble of thin platinum metal into which the rod enters (and, if desired, metallically sealed through an aperture in the base of the thimble), and the sealing of the platinum to the quartz is effected round the edge and on the outer surface of the thimble while the sides of the thimble are maintained in good thermal contact with the rod. The good thermal contact may in some cases be obtained merely by the tightness of fit of the rod within the thimble, but preferably during the sealing a massive sheath of a refractory heat-conductive material, such as tungsten or molybdenum, is applied round the outside of the thimble to sandwich the platinum between the rod and sheath and increase the conduction of heat away from the platinum, the sheath being removed after completion of the seal.

Preferably, the rod conductor is arranged to project beyond the end of the quartz tube in the completed seal-body, and the thimble of platinum is arranged to cover completely the projecting end of the rod. In this way, no part of the rod conductor is exposed to attack by atmospheric oxygen in use of a device of which the completed seal-body forms part. Electrical contact to the rod conductor is then made through the platinum thimble by means of a terminal clamped round the thimble and gripping the platinum thimble against the rod.

Figure 2:
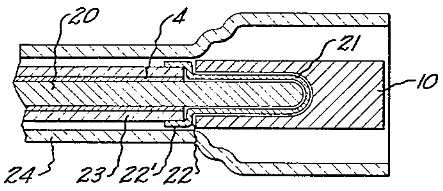
Figure 3:
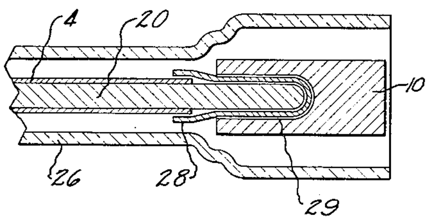
Figure 4:
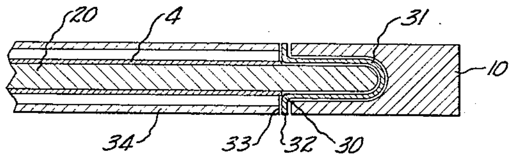

In the drawing accompanying and forming part of this specification, four assembled and partially completed seal-bodies or stems made in accordance with the method of the present invention and in the preferred form described in the preceding paragraph are shown, in which Fig. 1 is a side elevational view of such a lamp stem shown in section taken along its longitudinal axis, and Figs. 2, 3, and 4 are similar views of other lamp stems each of somewhat modified structure. Like numbers denote like parts in the figures.

In the stem illustrated in Fig. 1, there is used a refractory metal conductor 1 in the form of a stout rod of tungsten or molybdenum stepped at one end to form a cylindrical head portion 2 of increased diameter, the end 3 of the head being smoothly rounded. The main length or portion of the rod 1, of smaller diameter than the head 2, is wrapped in molybdenum foil 4 and onto the foil 4 is collapsed, by the usual heating and vacuum technique, an inner quartz tube 5 of such thickness that the outer surface 6 of the quartz tube 5 after the collapsing is flush with the cylindrical surface 7 of the head portion 2 of the rod 1.

A thimble 8 of thin platinum metal is then fitted over the head portion 2 of the rod 1, the size of the thimble 8 being such that it is a close push fit over the head 2 and its edge 9 extends slightly beyond the head 2 over the surface 6 of the quartz 5.

Over the thimble 8 is then fitted a cooling sheath 10 in the form of a relatively massive thimble of tungsten or molybdenum, the sheath being of block form at its closed end 11 and having a substantially square edge at its circular open end 12. The sheath 10 makes a good but slidable fit over the platinum thimble 8 and the depth of its recess or hollow interior is slightly less than the length of the platinum thimble 8 so that the edge 9 of the latter is exposed for a length of a few millimeters beyond the end 12 of the sheath 10.

In each of the Figs. 1 to 4 of the drawing, the inner surface of sheath 10 has been shown as spaced from the outer surface of the platinum thimble for clarity of illustration; but it will be understood that in actual practice these surfaces engage each other as described above.

The assembly is then fitted inside an outer quartz tube 13 which is expanded at one end 14 to accommodate the assembly at the head end of the rod 1 and at the other end 15 is flared into bulbous form (in the usual manner) so as to form, after cutting away end part 16 along the plane A—A′, on completion of the sealing, a flange 17 for use in sealing the body or stem 18 into an aperture of a quartz envelope (not shown). The intermediate portion 19 of the outer tube 13 is a slightly loose fit over the quartz-sheathed rod 1 and extends, before stepping at the expanded end 14, over the exposed part 9 of the platinum thimble 8.

The assembly is then evacuated from one end of the quartz tube 13, the other end being sealed off, and, after baking the assembly for degassing, the intermediate portion 19 of the tube 13 is collapsed by heat onto the quartz-sheathed rod 1, and onto the edge of the platinum thimble 8 to form the seal. During this process, the platinum is cooled by the conduction of heat away from it along the rod conductor 1 and along the refractory metal sheath 10 round the platinum thimble 8; and by taking care that the quartz is not unnecessarily overheated, a satisfactory seal is obtained.

After the seal-body or stem 18 has cooled, the expanded ends 14 and 16, respectively, of the outer quartz tube 13 are cut away along the planes AA′ and BB′ and the refractory metal sheath 10 over the platinum thimble 8 is withdrawn, to complete the seal-body. In some cases, a terminal clamp (not shown) may be fitted round the platinum thimble 8 or this may be left for subsequent attachment.

Fig. 2 illustrates a modification of this embodiment, wherein there is used a conductor rod 20 of uniform diameter, i. e. without a head portion, and the platinum thimble 21 fitted closely round the end of the rod 20 is outwardly flanged at its end 22. The sealing edge 22′ of the flange is turned to fit over the inner quartz tube 23 collapsed onto the molybdenum foil wrapped rod 20 and between this sheath 23 and the outer quartz tube 24 fitted over it.

Fig. 3 illustrates a further modification, wherein the inner quartz tube, such as tubes 5 and 23, collapsed onto the conductor rods 1 and 20 of Figs. 1 and 2, respectively, is dispensed with and the outer quartz tube 26 is collapsed directly onto the conductor rod 20 wrapped in molybdenum foil 4 and onto the edge 28 of the substantially straight sided platinum thimble 29.

Fig. 4 illustrates yet a further modification wherein the edge 30 of the platinum thimble 31 is flanged outwards and the flange 32 thus formed is sealed to the end face or outer surface 33 of the outer quartz tube 24. This may be effected by heating the quartz surface 33 with the flange 32 of the thimble 30 held close to but out of contact with it, and then sharply pressing the flange 32 against the heat-softened quartz.

By way of example, it may be stated that for forming a seal-body carrying a current of 100 amps., a molybdenum rod conductor of 3 mms. diameter (with head portion 2 (Fig. 1) 6 mms. in diameter, if used) and a platinum thimble of thickness 0.1 mm. tapering over the last 3 mms. to form a feather edge of thickness about .02 mm., using a molybdenum cooling sheath of thickness 1.5 mms. in the part round the platinum thimble, were found to be satisfactory.

It will be understood that in the drawing, for clarity of illustration, the thickness of the foil 4 and the thimbles 8, 21, 29, and 31 has been greatly exaggerated; that the thimbles 21, 29, and 31 of Figs. 2, 3, and 4, respectively, shown spaced from the ends of the respective conductor rods in these figures are in fact not so spaced but in fact closely fit said rod ends as described in connection with Fig. 1 and that the spacing between the outer quartz tubes 13, 24, 26, and 24 and the stem parts surrounded thereby has also been exaggerated in the drawing.

What we claim as new and desire to secure by Letters Patent of the United States is:

1. The method of making a quartz-to-metal seal of the type comprising a quartz tube and a platinum thimble which comprises the steps of shaping a thin sheet of platinum to a thimble making a close push fit on one end of a refractory metal rod insertable into the tube, assembling the rod, thimble and tube with the rod extending along and terminating within the tube and with the thimble covering completely and making good thermal contact with the end of the rod and with the edge only of the thimble in position for sealing with the inner surface of the tube, evacuating the tube, heat sealing the edge only of the thimble to the tube while maintaining the vacuum in the tube, and thereafter, on cooling of the tube and release of the vacuum, severing the end of the tube around the thimble and removing the severed tube end to expose the thimble for use as an electrical contact terminal.

2. The method of making a quartz-to-metal seal of the type comprising a quartz tube and a platinum thimble which comprises the steps of shaping a thin sheet of platinum to a thimble making a close push fit on one end of a refractory metal rod insertable into the tube, assembling the rod, thimble and tube with the rod extending along and terminating within the tube and with the thimble covering completely and making good thermal contact with the end of the rod and with the edge only of the thimble in position for sealing with the tube, fitting a cooling sheath in the form of a massive thimble of refractory metal over the platinum thimble to make good thermal contact therewith and to leave the edge only of the platinum thimble exposed beyond the edge of the massive thimble, evacuating the quartz tube, heat sealing the edge only of the platinum thimble to the tube while maintaining the vacuum in the tube and thereafter, on cooling of the tube and release of the vacuum, severing the end of the tube around the platinum thimble and removing the severed tube end and the cooling sheath to expose the platinum thimble for use as an electrical contact terminal.

References Cited in the file of this patent

UNITED STATES PATENTS

| | | |
|---|---|---|
| 1,848,544 | Raus | Mar. 8, 1932 |
| 1,909,797 | Anderson | May 16, 1933 |
| 2,089,044 | Thomas | Aug. 3, 1937 |
| 2,113,984 | Harris et al. | Apr. 12, 1938 |
| 2,251,062 | Lindwurm et al. | July 29, 1941 |
| 2,269,860 | Ramage | Jan. 13, 1942 |
| 2,273,488 | Hofman | Feb. 17, 1942 |
| 2,504,521 | Greiner | Apr. 18, 1950 |
| 2,583,388 | Nelson et al. | Jan. 22, 1952 |

FOREIGN PATENTS

| | | |
|---|---|---|
| 420,618 | Great Britain | Dec. 5, 1934 |
| 512,974 | Great Britain | Sept. 29, 1939 |